Patented Sept. 7, 1943

2,328,567

UNITED STATES PATENT OFFICE 2,328,567

COMPOSITION OF MATTER

Irving C. Matthews and William F. Lynch, Rochester, N. Y., assignors to Eastman Kodak Company, Rochester, N. Y., a corporation of New Jersey No Drawing. Original application January 24, 1940, Serial No. 315,400. Divided and this application October 30, 1940, Serial No. 363,578

8 Claims. (Cl. 260—3)

This is a division of our pending application, Serial No. 315,400, filed January 24, 1940, which is a continuation in part of our application, Serial No. 206,026, filed May 4, 1938, for a Composition of matter. The present invention relates to a composition of matter including two resins, and pertains more particularly to a homogeneous mass or mixture containing two synthetic resins. Said composition of matter, according to the invention, may be dissolved in solvents to form an all-purpose protective coating or may be used as a plastic for the production of molded articles.

Synthetic resins have been used individually as protective coatings and plastics, but when so used have been lacking in heat resistance, have had low chemical and atmospheric corrosion resistance, have been brittle and/or are subject to checking. When used as or in protective coatings, said individual synthetic resins have poor adhesion and are difficult to apply, such as being subject to cobwebbing during spraying.

The primary object of the present invention is the provision of a composition of matter which is remarkably tough and corrosion-resistant, and which produces a protective film or coating of exceptional adhesion and freedom from checking. Other objects of the invention will be apparent to those skilled in the art from the following disclosure.

Our improved composition of matter comprises a mixture or combination of the following resins: a reaction product of a polybasic or alpha-beta-dicarboxylic acid anhydride and terpinene; and a halogenated rubber.

The reaction product of a polybasic or of an alpha-beta-dicarboxylic acid anhyride and terpinene to be employed in the composition according to the invention may be prepared as follows.

Alpha-terpinene may be obtained by the fractionation of pine oil using the fraction boiling within about the range of 178°-182° C., and about 480 grams of such alpha-terpinene may be heated with about 294 grams of maleic anhydride, or alternatively with an equivalent quantity of maleic acid, at a temperature to cause gentle boiling, say about 150°-200° C. for a period of about five hours. If necessary or desirable, said reaction product may be further purified or refined by distillation under a diminished pressure by which procedure terpinene and impurities will be rendered volatile and so removed from the final reaction product in the still. The preferred reaction product is technically known as 3-isopropyl-6-methyl-3,6-indoethylene-Δ⁴-tetrahydro phthalic anhydride. Alternatively other alpha-beta-dicarboxylic acid anhydrides may be used for the foregoing synthesis, such as succinic acid anhyride.

In order further to enhance particular qualities, such as the gloss, flexibility or adhesion, of the final composition of matter, said reaction product of a polybasic acid anhydride and terpinene may, if desired, be modified in any one of several known ways. For instance, said reaction product may be modified by blending with a drying oil, with another synthetic resin, or with a natural resin such as rosin. Such methods of modification may or may not involve the use of heat, or may include the use of a common solvent and the modifying agent may be introduced before or after the reaction is completed, or may constitute the solvent in which the reaction occurs. Preferably and especially for compounding an all-purpose protective coating, said reaction product of a polybasic acid anhydride and terpinene is modified by heating said reaction product together with natural rosin.

The halogenated rubber to be employed in the production of the composition in accordance with this invention may be made from raw or vulcanized rubber by any of the methods known for its manufacture, and may be utilized in the chlorinated or brominated state. Preferably a chlorinated rubber having a chlorine content of about 67% will be employed, but it will be understood that rubber containing any substantial percentage of chlorine, say as low as 50%, will be usable. The viscosity characteristic of the chlorinated rubber to be used will depend upon the type of composition desired. For a coating composition the chlorinated rubber will preferably have a viscosity of from 5 to about 10,000 centipoises in 20% solution in xylol at 25° C. Where the chlorinated rubber is to be used in the formation of plastics or molded objects, a much higher viscosity may be used.

When the aforesaid synthetic resins are mixed in the combinations and proportions disclosed herein, compositions of matter having remarkable characteristics are obtained. A composition of matter having good flexibility and excellent gloss is obtained by physically combining together 10–40 parts of the reaction product of a polybasic acid anhydride and terpinene and 50–10 parts of halogenated rubber.

The following example will further illustrate the nature of this invention, which however, is not restricted thereto, and will further indicate the particular characteristics and advantageous properties of the combinations of the aforementioned synthetic resins.

*Example*

A protective coating or plastic of great hardness and/or adhesion to metal is obtained by combining or mixing 10-40 parts of a reaction product of a polybasic acid anhydride and terpinene, and 50-10 parts of halogenated rubber, either in a suitable solvent mixture or in a properly plasticized solid state. The reaction product is preferably prepared with maleic anhydride or maleic acid and terpinene but can also be made from succinic acid or anhydride and terpinene. Also the preferred proportions of the ingredients are equal parts of the reaction product of a polybasic acid anhydride and terpinene, and of the halogenated rubber which can be either in the chlorinated or brominated state.

To form a lacquer, the aforementioned mixture may be dissolved in a suitable quantity of a solvent, such as a solvent mixture comprising 50% toluene, 25% xylene, 12½% amyl acetate, and 12½% coal tar solvent naphtha. Although the solvent mixture herein disclosed has been very successfully employed, it is to be understood that the ingredients and proportions thereof may be varied considerably, and for instance if slow drying films or slow drying adhesives are required the solvent mixture may be modified by the addition or substitution of comparatively high boiling solvents which are compatible with the other ingredients used. On the other hand, as is known, quick drying films or adhesives are obtained by the addition or substitution of comparatively low boiling solvents to the solvent mixture.

Having now particularly described our invention, what we desire to secure by Letters Patent of the United States and what we claim is:

1. As a composition of matter, a physical mixture comprising 10-40 parts of a reaction product of a polybasic acid anhydride and terpinene, and 50-10 parts of a halogenated rubber from the group consisting of chlorinated rubber and brominated rubber.

2. As a composition of matter, a physical mixture comprising 10-40 parts of a reaction product of a maleic acid anhydride and terpinene, and 50-10 parts of a halogenated rubber from the group consisting of chlorinated rubber and brominated rubber.

3. As a composition of matter, a physical mixture comprising 10-40 parts of a reaction product of a polybasic acid anhydride and terpinene, and 50-10 parts of a chlorinated rubber.

4. As a composition of matter, a physical mixture comprising 10-40 parts of a reaction product of a polybasic acid anhydride and terpinene, and 50-10 parts of a brominated rubber.

5. As a composition of matter, a physical mixture comprising equal parts of a reaction product of a polybasic acid anhydride and terpinene, and of a halogenated rubber from the group consisting or chlorinated rubber and brominated rubber.

6. As a composition of matter, a physical mixture comprising equal parts of a reaction product of a maleic acid anhydride and terpinene, and of a halogenated rubber from the group consisting of chlorinated rubber and brominated rubber.

7. As a composition of matter, a physical mixture comprising equal parts of a reaction product of a polybasic acid anhydride and terpinene, and of a chlorinated rubber.

8. As a composition of matter, a physical mixture comprising equal parts of a reaction product of a polybasic acid anhydride and terpinene, and of a brominated rubber.

IRVING C. MATTHEWS.
WILLIAM F. LYNCH.